United States Patent [19]
Apperson

[11] 4,428,100
[45] Jan. 31, 1984

[54] FLIP TOP AUTOMATIC DEADEND

[75] Inventor: Kenneth P. Apperson, Pinson, Ala.

[73] Assignee: Square D Company, Palatine, Ill.

[21] Appl. No.: 369,053

[22] Filed: Apr. 16, 1982

[51] Int. Cl.³ .............................................. F16G 11/00
[52] U.S. Cl. ................................................. 24/115 R
[58] Field of Search ........................ 403/312, 314, 212;
339/265, 273; 24/115 R, 132, 115 H, 115 K, 136
L, 115 M, 268; 294/102 R, 86.31, 94, 86 CG

[56] References Cited
U.S. PATENT DOCUMENTS 3,776,586 12/1973 Ahlgren ........................... 294/102 R
4,236,281 12/1980 Bottum ............................... 24/115 R Primary Examiner—Robert Peshock
Attorney, Agent, or Firm—Stephen A. Litchfield; Richard T. Guttman

[57] ABSTRACT

An anchoring device for a conductor including an elongated main body which has a recess that has a gripping jaw slideably supported therein. A cover having a corresponding recess and a corresponding jaw in the recess. The cover is pivotally supported on the main body so it can be opened for receipt of a conductor and is closed and the jaws released to produce a gripping force on the conductor. The clamping device also has biasing means for biasing the corresponding jaw towards one end of the clamp to produce an initial gripping force on the conductor.

14 Claims, 10 Drawing Figures

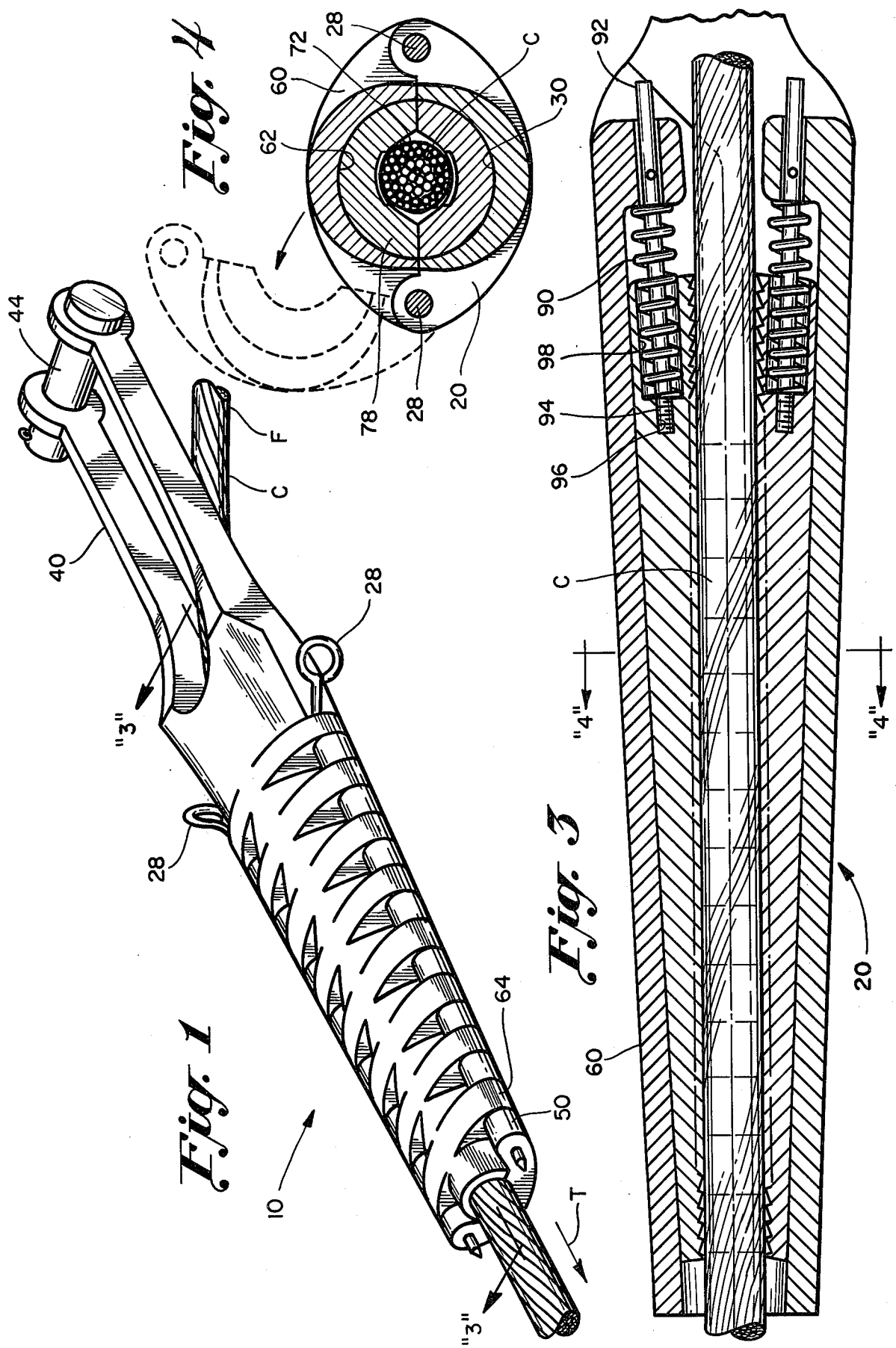

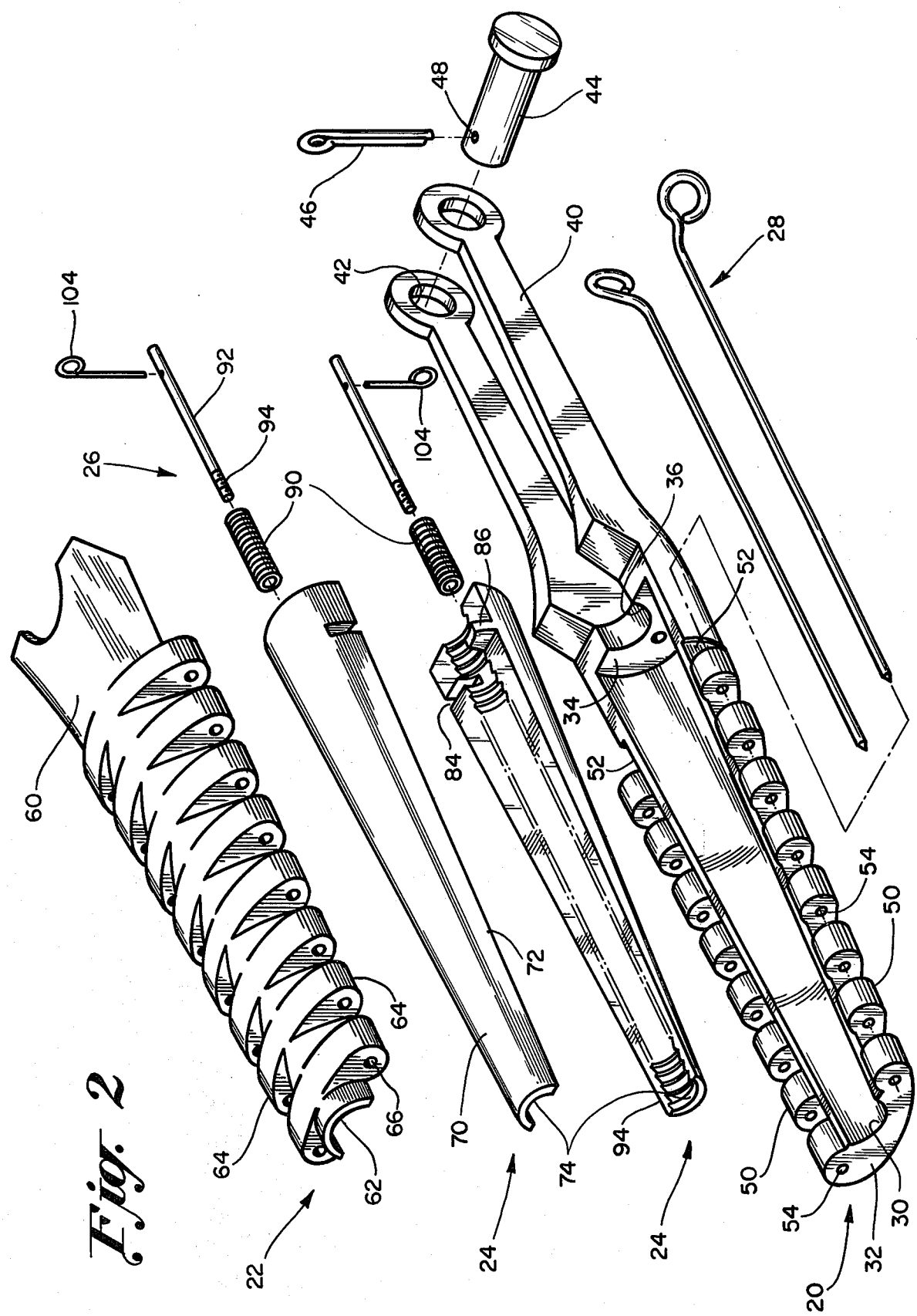

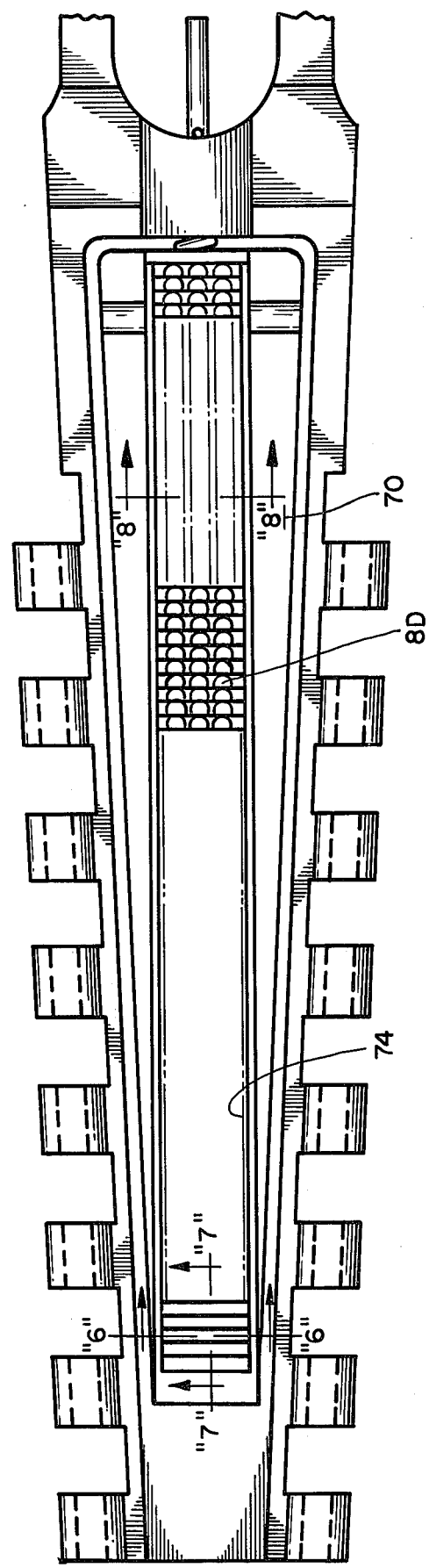
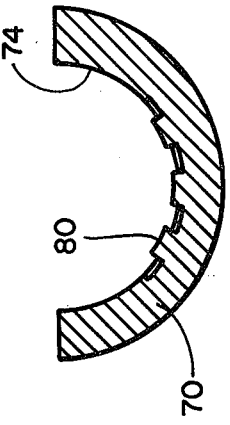
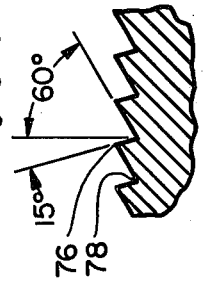
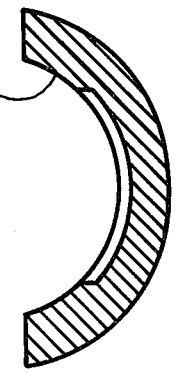

4,428,100

FLIP TOP AUTOMATIC DEADEND

DESCRIPTION

1. Technical Field

The present invention relates generally to a gripping device for conductors and, more specifically, to an automatic clamping member for clamping an end of a conductor.

2. Background Prior Art

In the field of power transmission, there are many needs for various types of clamping devices for gripping conductors at various locations. One such need arises when the end of a conductor must be connected to a supporting structure. Usually such conductors, when used for transmitting high-voltage power, are large and are under a heavy tension load.

One type of clamp, commonly called a dead-end clamp as disclosed in U.S. Pat. No. 3,470,528, that has been marketed for some time by the assignee of the present invention includes an open groove clamp. In this structure, an open substantially V-shaped groove is formed on the periphery of a clamp body. A jaw holds the conductor in place in the groove. The operation of connecting the clamp to the conductor includes unlocking the U-shaped clamping bolts, pivoting the jaw so that the conductor can be inserted in the groove, positioning the jaw above the groove, and securing the conductor in the groove by locking the U-shaped clamping bolts to hold the jaw firmly against the conductor.

Such a system is rather time consuming and, thus, there remains a need for a simplified version of a clamping device which does not require the large amount of lineman's time to install.

In a related field of the splicing of the conductors, various proposals have been made for inter-connecting two spliced ends of a wire or conductor. Examples of such devices ae disclosed in U.S. Pat. Nos. 2,144,050; 2,966,653; 3,205,300; and, 3,241,204.

All of the clamping devices disclosed in these patents for intersplicing two spliced ends of a wire or conductor utilize the same general concept of having two halves of a clamping member supported within a tapered opening in a supporting body and biased towards a clamping position. With such devices, it is necessary to cut the wire to the exact desired length, thread the wire through the opening at one end of the clamping device, and then release the clamping device so that the wedge halves move toward each other and produce the clamping action.

While such devices have been used for splicing and dead ending conductors, these devices have found limited acceptance. Partially, this lack of acceptance in utilizing such a clamping concept in high-power transmission systems is believed to be because of the necessity of inserting a large conductor into an opening at the end of the clamp. Additionally, when utilizing a clamp device of the type disclosed in these patents for interconnecting two spliced ends of a wire or conductor, it is necessary to precut the conductor or wire to the desired finished length prior to insertion into the end of the clamping device. The present invention does not require such insertion or cutting.

SUMMARY OF THE INVENTION

According to the present invention, a gripping device has been developed for automatically gripping a conductor which can be installed without the use of any special tools and in which the conductor need not be cut to any prescribed length before being clamped thereto.

More specifically, the gripping or anchoring device of the present invention consists of an elongated main body that has an arcuate elongated recess therein and a cover that has a corresponding arcuate recess with releasable means retaining the cover on the main body with the recesses cooperating to define an elongated opening that is open at both ends. A pair of gripping jaws or wedges are supported in the respective recesses for axial movement to grip a conductor therebetween.

According to one aspect of the present invention, the main body and cover are interconnected in such a fashion that the cover can be moved to an open position to expose the gripping devices located in the cover and the body. A conductor can then be positioned therein and the cover closed to surround the conductor.

The elongated recesses in the body and cover cooperate to produce a reducing tapered opening and the gripping jaws or wedges have a corresponding taper so that tension on the conductor will force the gripping jaws towards each other and increase the compressive holding forces which are thus directly related to the tension in the conductor.

In the preferred form of the invention, the respective gripping devices are biased to a position towards one end of the main body and are initially retained in a first position until the conductor is located between the two gripping jaws. The gripping jaws are then released so that the spring force of the tensioning device produces axial movement of the gripping jaws within the body and cover to produce the initial gripping force which ultimately will be directly related to the tension in the conductor.

According to a further aspect of the invention, the biasing means for biasing the gripping wedges towards one end of the body are also utilized for maintaining the gripping wedges or jaws within the recesses while the cover is moved between an open and closed position.

In one form of the invention, the biasing means includes a pair of pins that respectively extend from the ends of the adjacent wedge halves and are received into openings in the body and the cover with compression springs telescoped over the respective pins to produce the biasing force. In an alternate version, the body, cover and wedge halves have respective aligned counterbores with compression springs received into the aligned counterbores.

In the illustrated embodiment of the present invention, the elongated main body and the cover have interleaved ears which have openings that are aligned with each other along both lateral edges and pins extend through the respective openings on the opposite lateral edges. One of the pins can, therefore, be removed and the cover pivoted from a closed to an open position for receiving the conductor after which the cover is closed and the pin is inserted through the openings.

BRIEF DESCRIPTION OF SEVERAL VIEWS OF DRAWINGS

FIG. 1 discloses a perspective view of the gripping or anchoring device of the present invention with a conductor in a gripping position;

FIG. 2 is an exploded perspective view of the various components of the gripping device shown in FIG. 1;

FIG. 3 is an enlarged fragmentary cross-sectional view as viewed along line 3—3 of FIG. 1;

FIG. 4 is a cross-sectional view as viewed along line 4—4 of FIG. 3;

FIG. 5 is a plan view of the main body of the gripping device with the gripping jaw positioned therein and the cover removed;

FIG. 6 is an enlarged fragmentary cross-sectional view as viewed along line 6—6 of FIG. 5;

FIG. 7 is a fragmentary cross-sectional view as viewed along line 7—7 of FIG. 5;

FIG. 8 is a fragmentary enlarged cross-sectional view as viewed along line 8—8 of FIG. 5;

DETAILED DESCRIPTION

Figure 9:
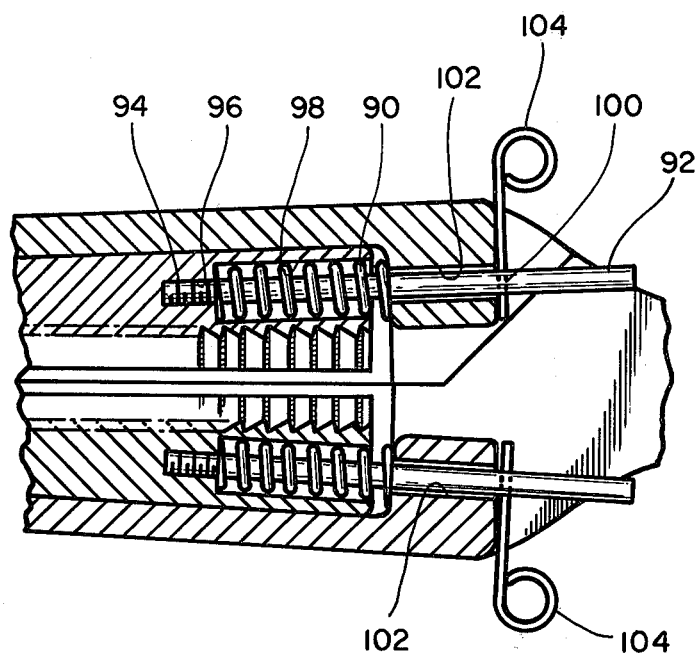
FIG. 9 is an enlarged fragmentary cross-sectional view showing the retention and biasing mechanism of the clamping mechanism.

While this invention is susceptible of embodiment in many different forms including both deadend and splicing applications, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings discloses a clamping device, generally designated by reference numeral 10, which is particularly adapted to act as a dead-end clamp for a large high-voltage conductor (C). The various components of the gripping or anchoring device shown in FIG. 1 are illustrated in exploded view in FIG. 2 and will be described in reference thereto. Gripping device 10 consists of an elongated main body 20, a cover 22, a pair of identical gripping devices 24, a pair of biasing means 26 and a pair of retaining means or pins 28.

Elongated main body 20 has a generally semi-circular elongated recess 30 which is open at the outer or leading end 32 and has an abutment 34 at the opposite or tail end. The abutment also has a generally semi-circular recess 36, for a purpose that will be described later.

Elongated main body 20 also has a pair of arms 40 forming a generally clevis structure with openings 42 adapted to receive a pin 44 for anchoring the main body to a fixed support structure (not shown), such as a high-tension pole. The pin may be retained in position by a cotter pin 46. Elongated main body 20 also has a plurality of spaced ears 50 located along both lateral edges 52 of the main body with each of the ears having aligned openings 54, for a purpose to be described later.

Elongated cover 22 includes a main body 60 which has an elongated arcuate recess 62 which corresponds substantially to recess 30 in main body 20 and is open at both ends, for a purpose that will be described later. The elongated cover 22 has a plurality of spaced ears 64 along both lateral edges, each of which has an opening 66 therein. As will be apparent, the ears 64 are dimensioned and spaced such that they interleaf with ears 50 on the main body, as will be described later.

The next major component of the clamping device 10 is the gripping means 24. The gripping means consists of identical wedge halves each having an elongated main body 70 which has a semi-circular outer surface 72 that has a taper which corresponds to the taper of recesses 30 and 62. Elongated main body 70 also has an arcuate recess 74 on an inner surface thereof. As illustrated in FIGS. 5–8, the wedge halves or gripping jaws have a plurality of axially-spaced projections 76 which define a plurality of annular grooves 78 along the entire length of the arcuate inner recess 74. The inner arcuate recess also has a plurality of rows of projections 80 which are illustrated in FIGS. 5 and 8. These rows of projections, which are preferably three in number, are located on what may be considered the tail end of the clamp, as will be described later.

As illustrated in FIGS. 2 and 5, main body 70 also has a recess 84 along one lateral edge of the main body and an aligned lug 86 at the opposite lateral edge. The recesses and lugs on the two wedge halves 70 are designed to be received into each other when the wedge halves are located in position, as will be described later.

The biasing means 26 is most clearly illustrated in FIGS. 2, 3 and 9, and includes a compression coil spring 90 which is telescoped over a pin 92 which has a threaded end 94 received into a threaded opening 96 formed at the bottom end of an enlarged counterbore 98. As shown in FIGS. 3 and 9, each pin 92 has a transverse opening 100 intermediate opposite ends thereof and is slideably supported within an elongated opening 102, two of which are respectively formed in the main body 20 and the cover 22, and a release pin 104 is received into each opening 100.

The novel clamp is initially assembled at the manufacturing cite by initially threading pins 92 into threaded openings of the respective jaws 70 and telescoping the coil spring 90 over the outer end of the rods. The pins 92 are then inserted into the respective openings 102 in cover 22 and main body 20. The coil springs are then manually compressed until the transverse openings 100 are exposed for reception of release pins 104. The release pins 104 thus hold the respective gripping members or jaws in a first position, in which the springs are compressed. The pins 92 in this position also act to hold the respective gripping jaws within the respective recesses 30 and 62. It should be noted that in this position the respective lugs 86 are received into the respective recesses 84. The cover is then positioned on the main body so that the ears 64 interleaf with ears 50 and openings 54 and 66 are aligned so that pins 28 can be inserted through the respective openings on opposite lateral edges 52 of the elongated main body. The pin 44 can then be inserted into openings 42 and cotter pin inserted into the opening 48, at which time the gripping device is ready for shipment.

When it is desired to utilize the clamping device, the clevis pin 44 is removed and the device is attached to a fixed support (not shown) to which a conductor (C) is to be ultimately secured. A conventional sagging device is used to relieve the end of conductor (C) of any tension. One of the pins or retaining means 28 is then removed and the cover is pivoted from the solid line position to the dotted line position of FIG. 4. In this position, the entire inner recess 74 of the jaw 70, located within the main body 20, is exposed so that a conductor (C) can be positioned therein and be received into the respective open ends 32 and 36. The cover is then moved to the closed position and pin 28 is reinserted into openings 54 and 66. The tension pins 104 are then released and the compression of springs 90 will move both of the gripping jaws towards the leading end 32 of the main body and cover and the tapered surfaces will also cause the jaws to move radially towards each other to securely grip the conductor (C) within the anchoring device. After the retention pins 104 have been removed and the conductor (C) has been initially gripped by the gripping jaws, the sagging device can be released and the tension, illustrated by the arrow T in FIG. 1, will move the gripping jaws 24 towards the leading end and increase the gripping force. Since the gripping jaws move uniformly because of the interacting lugs and recesses 84, 86, an equal compressive force will be applied which will be directly related to the tension in the conductor.

Thus, it will be appreciated that the novel clamping device can be positioned in a cable clamp in a minimum period of time without the use of any extraneous tools. Also, there is no need for cutting the conductor to any specified length since the conductor can be inserted into the gripping device when the cover is in an open position and the free or tail end (F) can be of any length because it is unobstructed.

Figure 10:
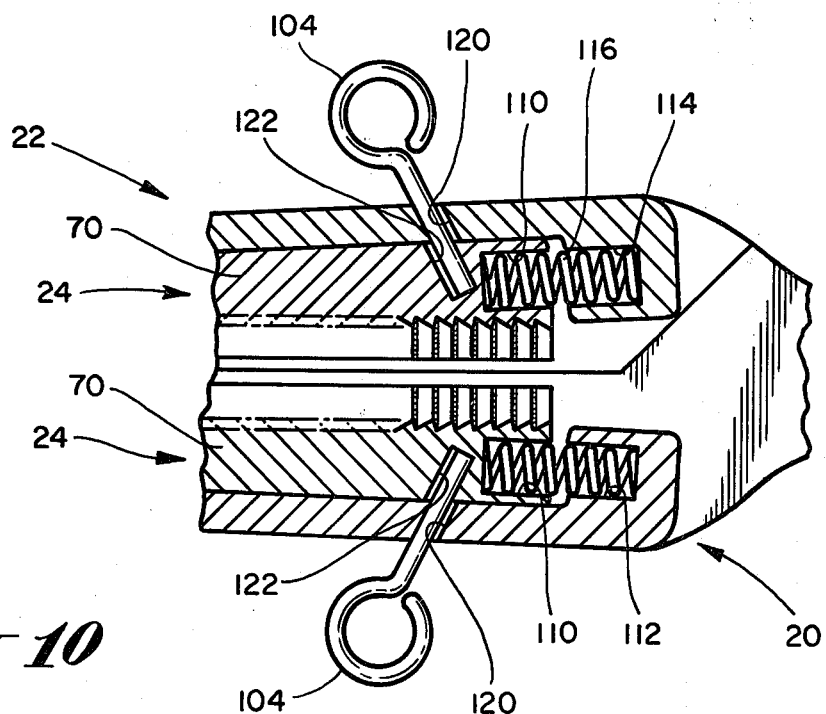
FIG. 10 is a view similar to FIG. 9 showing a slightly modified form of the biasing mechanism.

A slightly modified form of biasing means is illustrated in FIG. 10 and corresponding reference numerals have been applied to corresponding parts. In the modified form of the invention, pin 92 is eliminated and each of the jaws 70 has a counterbore 110 extending from the inner or tail end thereof. Likewise, main body 20 has a counterbore 112 aligned with one of the counterbores 110 while the cover 20 has a second counterbore 114 aligned with the other counterbore 110. A pair of identical compression coil springs 116 are received into the respective pairs of aligned counterbores and act as the biasing means, as well as the retaining means, for the gripping jaws 70. In this version of the invention, retention pins 104 are respectively received into openings 120 extending through body 20 and cover 22 and are received into respective openings 122 in gripping jaws 70. In all other respects, the construction of the modified form of the biasing means is similar.

Numerous modifications come to mind without departing from the spirit of the invention. For example, the cover could be permanently pivotally attached along one lateral edge to the main body 20 and only a single releasable pin 28 could be utilized. Of course, it is not necessary to have the piano hinge arrangement for the pivotal interconnection and other types of pivoting connections could be utilized.

I claim:

1. A gripping device for a conductor comprising a main body having means for connecting said gripping device to a support, said main body having lateral edges and an arcuate elongated recess therein said recess having a tapering cross-section; a cover having an elongated arcuate recess, said recess having a corresponding tapering cross-section; releasable means for releasably retaining said cover on said main body with said recesses cooperating to define an elongated opening through the length of said device and open at two ends of said device, said opening having a tapering, circular cross-section, such that one end cross-section has a diameter greater than the other end cross-section, gripping means supported in said opening having means for biasing said gripping means towards the other end cross-section and means for releasably retaining said gripping means in a first position adjacent the one end cross-section.

2. A gripping device as defined in claim 1 in which said releasable means includes a pivot means along one lateral edge of said main body and cover such that said cover can be pivoted between open and closed positions, and retaining means along an opposite lateral edge of said body and cover for retaining said cover in a closed position.

3. A gripping device as defined in claim 2 in which said main body and cover have interleaved ears having openings along both lateral edges each opening in axial alignment with the other openings and pins extending through respective openings on both lateral edges respectively defining said pivot means and said retaining means.

4. A gripping device as defined in claim 3 in which at least one of said pins is removable from said openings.

5. A gripping device as defined in claim 1 in which said gripping means each have a taper corrresponding to said reducing taper of the main body and cover elongated opening.

6. A gripping device as defined in claim 5 in which said gripping means includes wedge halves one in each respective recess and cooperating to produce a substantially circular opening open at both ends of said device.

7. A gripping device as defined in claim 6 in which said wedge halves have an arcuate surface having annular axially-spaced grooves defining spaced serrations and in which said arcuate surface has projections extending inwardly of said circular opening adjacent at least one end of said circular opening.

8. A gripping device as defined in claim 1 in which said gripping means includes wedge halves in respective recesses.

9. A gripping device as defined in claim 8 in which said biasing means includes a compression coil spring between respective wedge halves and said main body and cover, and releasable retaining means retaining said coil springs in a compressed condition.

10. A gripping device as defined in claim 9 in which said wedge halves respectively have pins extending from one end and said coil springs are telescoped over said pins and in which said main body and cover respectively have openings for slideably receiving said pins.

11. A gripping device as defined in claim 9 in which said wedge halves have counterbores at one end and said main body and cover have counterbores receiving respective coil springs.

12. An anchoring device for a conductor comprising an elongated body having lateral edges and an elongated recess with a semi-circular cross-section, open at both ends, said recess having a taper constantly reducing from a first end to a second end of said device, a cover pivotally supported along one lateral edge of said elongated body and movable between open and closed positions, said cover having a recess therein corresponding to said tapered recess in said elongated body and aligned therewith in said closed position, means for retaining said cover in said closed position, first and second substantially identical gripping members axially movable in respective recesses, biasing means biasing said gripping members towards said second end and retaining means retaining said biasing means in a compressed condition adjacent said first end and releasable to cause said gripping members to move toward said second end and grip a conductor therebetween.

13. An anchoring device as defined in claim 12 in which said gripping members having pins extending from one end and said body and cover having openings receiving said pins and in which said biasing means includes compression springs telescoped over said pins.

14. An anchoring device as defined in claim 12 in which said gripping members have counterbores at one end thereof and said body and cover having counterbores respectively aligned with said counterbores on said respective gripping members and in which said biasing means includes first and second compression springs received into the respective counterbores.

* * * * *